(12) United States Patent
Kuo

(10) Patent No.: US 9,237,489 B2
(45) Date of Patent: Jan. 12, 2016

(54) METHOD AND APPARATUS FOR SECONDARY CELL RELEASE DURING HANDOVER IN A WIRELESS COMMUNICATION SYSTEM

(75) Inventor: Richard Lee-Chee Kuo, Taipei (TW)

(73) Assignee: INNOVATIVE SONIC CORPORATION, Taipei (TW)

(*) Notice: Subject to any disclaimer, the term of this patent is extended or adjusted under 35 U.S.C. 154(b) by 1112 days.

(21) Appl. No.: 13/282,974

(22) Filed: Oct. 27, 2011

(65) Prior Publication Data

US 2012/0106510 A1 May 3, 2012

Related U.S. Application Data

(60) Provisional application No. 61/409,416, filed on Nov. 2, 2010.

(51) Int. Cl.
*H04W 36/00* (2009.01)
*H04W 76/06* (2009.01)

(52) U.S. Cl.
CPC ........ *H04W 36/0055* (2013.01); *H04W 76/064* (2013.01)

(58) Field of Classification Search
CPC ................... H04W 36/0055; H04W 76/064
USPC ................................................ 370/331, 332
See application file for complete search history.

(56) References Cited

PUBLICATIONS

Introduction of Carrier Aggregation, R2-104991, Aug. 23-27, 2010.*
Optimization of Intra-eNB Pcell change procedure, R2-104421, Aug. 23-27, 2010.*
3GPP TS 36.300 V10.1.0 (Sep. 2010).
TSG-RAN WG2#71, Aug. 23-27, 2010, Madrid, Spain.
3GPP TSG-RAN2 Meeting #71bis, Xi'an, China, Oct. 11-15, 2010, Madrid, Spain.
Office Action on corresponding KR Patent Application No. 10-2011-0112048 Oct. 31, 2013.
3GPP TS 36.300 V10.0.0 (Jun. 2010).
3GPP TSG-RAN WG2 Meeting #71 bis. Xian, P.R. China. Oct. 11-15, 2010.
3GPP TSG-RAN WG2 Meeting #70 bis, Montreal, Canada. May 10-14, 2010.
TSG-RAN WG2 Meeting #71, Aug. 23-26, 2010, Madrid, Spain.
Search Report on corresponding EP Patent Application No 11008725.1 dated Jan. 27. 2012.

* cited by examiner

*Primary Examiner* — Man Phan
*Assistant Examiner* — Mandish Randhawa
(74) *Attorney, Agent, or Firm* — Blue Capital Law Firm, P.C.

(57) ABSTRACT

Methods and an apparatus for Secondary Cell (SCell) release during User Equipment (UE) handover comprises including information by a source eNB in a HandoverPreparationInformation message for a target eNB to control SCell release in the UE during handover, or including an indicator by a target eNB in a handover command for the UE to distinguish whether or not to release all configured SCells.

22 Claims, 6 Drawing Sheets

METHOD AND APPARATUS FOR SECONDARY CELL RELEASE DURING HANDOVER IN A WIRELESS COMMUNICATION SYSTEM

CROSS-REFERENCE TO RELATED APPLICATIONS

The present Application claims the benefit of U.S. Provisional Patent Application Ser. No. 61/409,416, filed on Nov. 2, 2010, the entire disclosure of which is incorporated herein by reference.

FIELD

This disclosure generally relates to wireless communication networks, and more particularly, to a method and apparatus for Secondary Cell (SCell) release during handover in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

According to one aspect, a method of Secondary Cell (SCell) release during handover comprises including information by a source eNB in a HandoverPreparationInformation message for a target eNB to control SCell release in a User Equipment (UE) during handover.

According to another aspect, a method of Secondary Cell (SCell) release during handover comprises including an indicator by a target eNB in a handover command for a User Equipment (UE) to distinguish whether or not to release all configured SCells.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced), 3GPP2 UMB (Ultra Mobile Broadband), WiMax, or some other modulation techniques.

In particular, The exemplary wireless communication systems devices described below may be designed to support one or more standards such as the standard offered by a consortium named "3rd Generation Partnership Project" referred to herein as 3GPP, including Document Nos. TS36.331-940, TS36.300-950, and R2-105971. The standards and documents listed above are hereby expressly incorporated herein.

Figure 1:
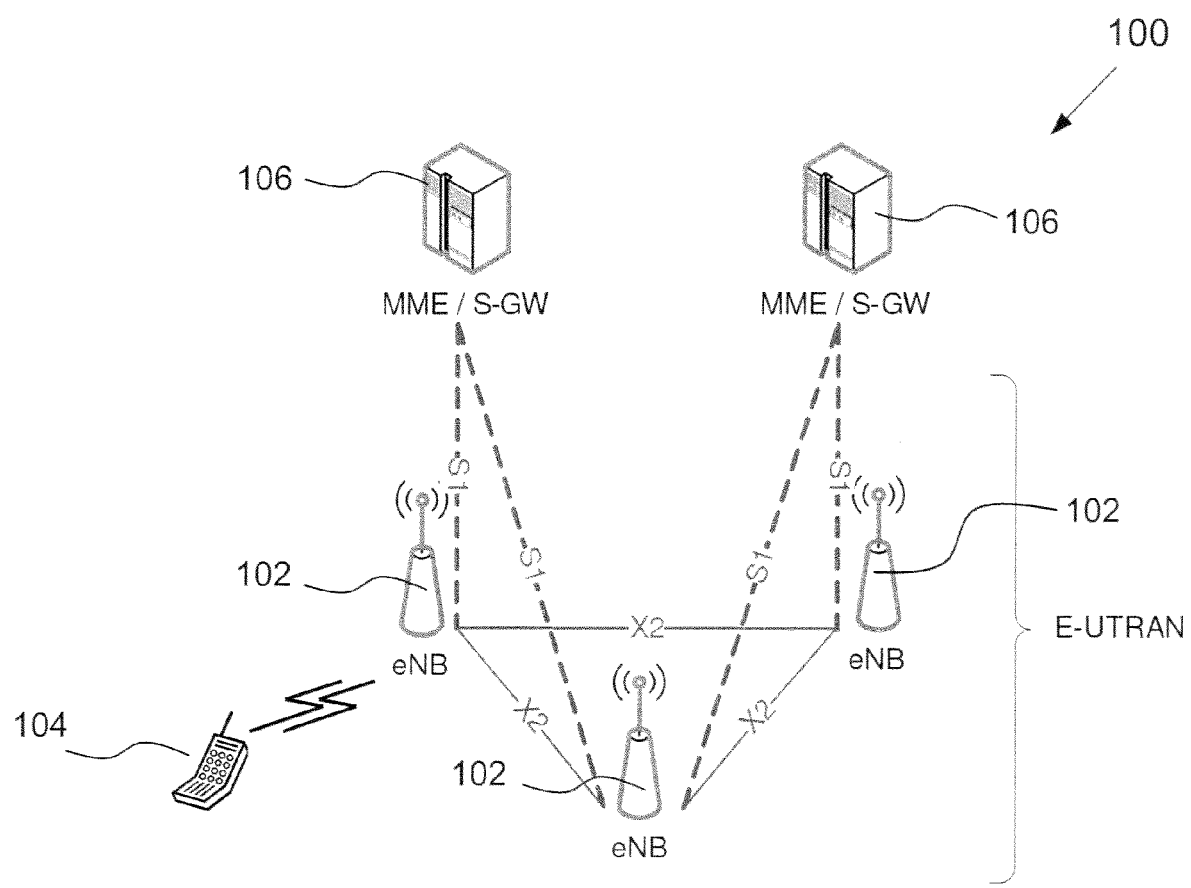
FIG. 1 shows a diagram of a wireless communication system according to one exemplary embodiment.

An exemplary network structure of an Evolved Universal Terrestrial Radio Access Network (E-UTRAN) 100 as a mobile communication system is shown in FIG. 1 according to one exemplary embodiment. The E-UTRAN system can also be referred to as a LTE (Long-Term Evolution) system or LTE-A (Long-Term Evolution Advanced). The E-UTRAN generally includes eNode B or eNB 102, which function similar to a base station in a mobile voice communication network. Each eNB is connected by X2 interfaces. The eNBs are connected to terminals or user equipment (UE) 104 through a radio interface, and are connected to Mobility Management Entities (MME) or Serving Gateway (S-GW) 106 through S1 interfaces.

Figure 2:
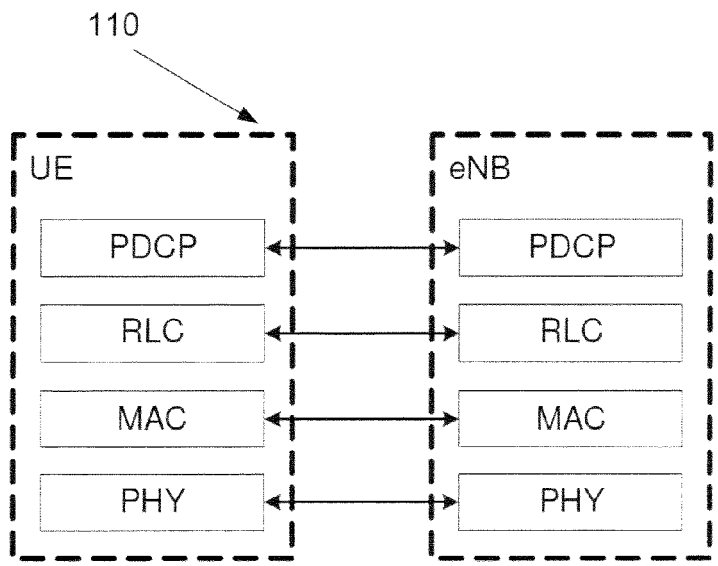
FIG. 2 shows a user plane protocol stack of the wireless communication system of FIG. 1 according to one exemplary embodiment.
Figure 3:
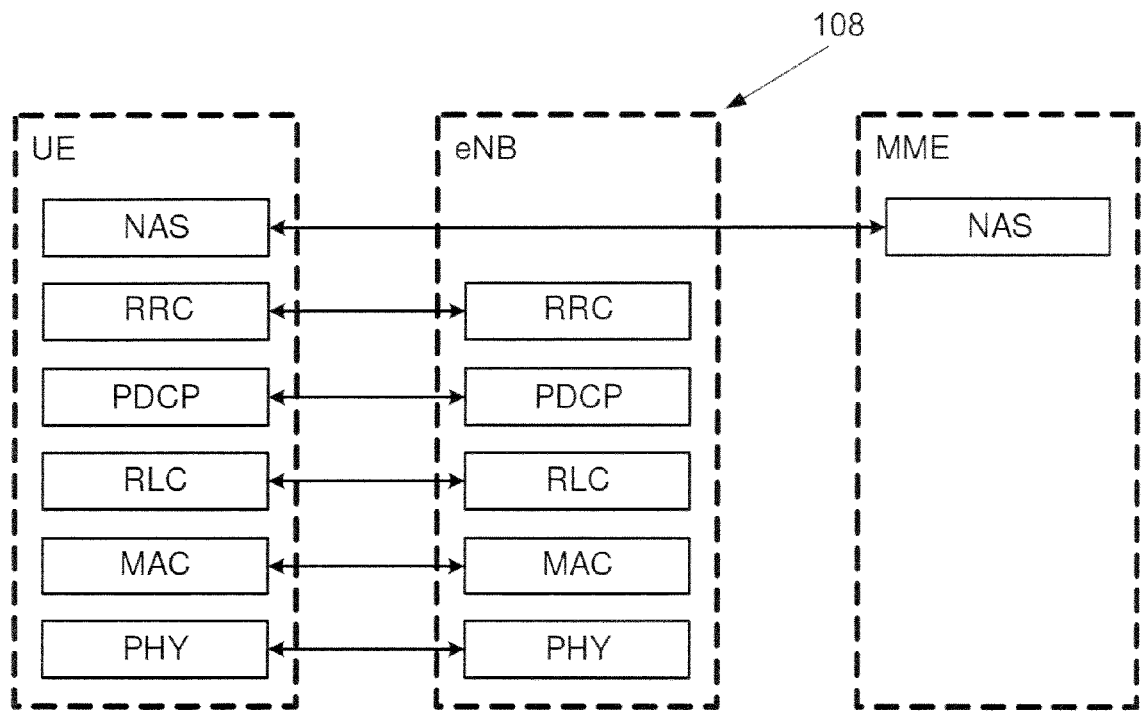
FIG. 3 shows a control plane protocol stack of the wireless communication system of FIG. 1 according to one exemplary embodiment.

Referring to FIGS. 2 and 3, the LTE system is divided into control plane 108 protocol stack (shown in FIG. 3) and user plane 110 protocol stack (shown in FIG. 2) according to one exemplary embodiment. The control plane performs a function of exchanging a control signal between a UE and an eNB and the user plane performs a function of transmitting user data between the UE and the eNB. Referring to FIGS. 2 and 3, both the control plane and the user plane include a Packet Data Convergence Protocol (PDCP) layer, a Radio Link Control (RLC) layer, a Medium Access Control (MAC) layer and a physical (PHY) layer. The control plane additionally includes a Radio Resource Control (RRC) layer. The control plane also includes a Network Access Stratum (NAS) layer, which performs among other things including Evolved Packet System (EPS) bearer management, authentication, and security control.

The PHY layer provides information transmission service using a radio transmission technology and corresponds to a first layer of an open system interconnection (OSI) layer. The PHY layer is connected to the MAC layer through a transport channel. Data exchange between the MAC layer and the PHY layer is performed through the transport channel. The transport channel is defined by a scheme through which specific data are processed in the PHY layer.

The MAC layer performs the function of sending data transmitted from a RLC layer through a logical channel to the PHY layer through a proper transport channel and further performs the function of sending data transmitted from the PHY layer through a transport channel to the RLC layer through a proper logical channel. Further, the MAC layer inserts additional information into data received through the logical channel, analyzes the inserted additional information from data received through the transport channel to perform a proper operation and controls a random access operation.

The MAC layer and the RLC layer are connected to each other through a logical channel. The RLC layer controls the setting and release of a logical channel and may operate in one of an acknowledged mode (AM) operation mode, an unacknowledged mode (UM) operation mode and a transparent mode (TM) operation mode. Generally, the RLC layer divides Service Data Unit (SDU) sent from an upper layer at a proper size and vice versa. Further, the RLC layer takes charge of an error correction function through an automatic retransmission request (ARQ).

The PDCP layer is disposed above the RLC layer and performs a header compression function of data transmitted in an IP packet form and a function of transmitting data without loss even when an eNB providing a service changes due to the movement of a UE.

The RRC layer is only defined in the control plane. The RRC layer controls logical channels, transport channels and physical channels in relation to establishment, re-configuration and release of Radio Bearers (RBs). Here, the RB signifies a service provided by the second layer of an OSI layer for data transmissions between the terminal and the E-UTRAN. If an RRC connection is established between the RRC layer of a UE and the RRC layer of the radio network, the UE is in the RRC connected mode. Otherwise, the UE is in an RRC idle mode.

Figure 4:
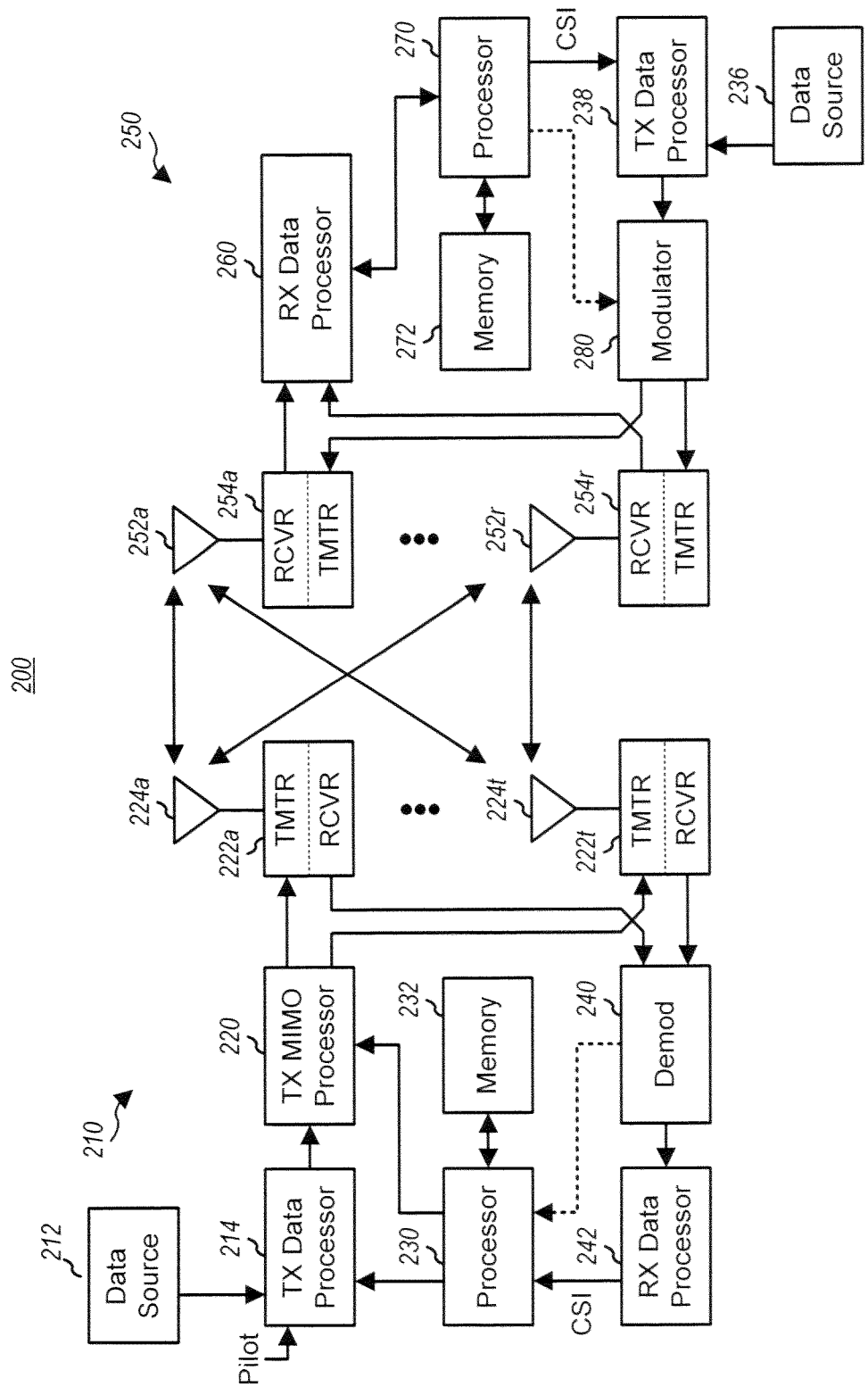
FIG. 4 is a block diagram of a transmitter system (also known as access network) and a receiver system (also known as user equipment or UE) according to one exemplary embodiment.

FIG. 4 is a simplified block diagram of an exemplary embodiment of a transmitter system 210 (also known as the access network) and a receiver system 250 (also known as access terminal or UE in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g. filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 5:
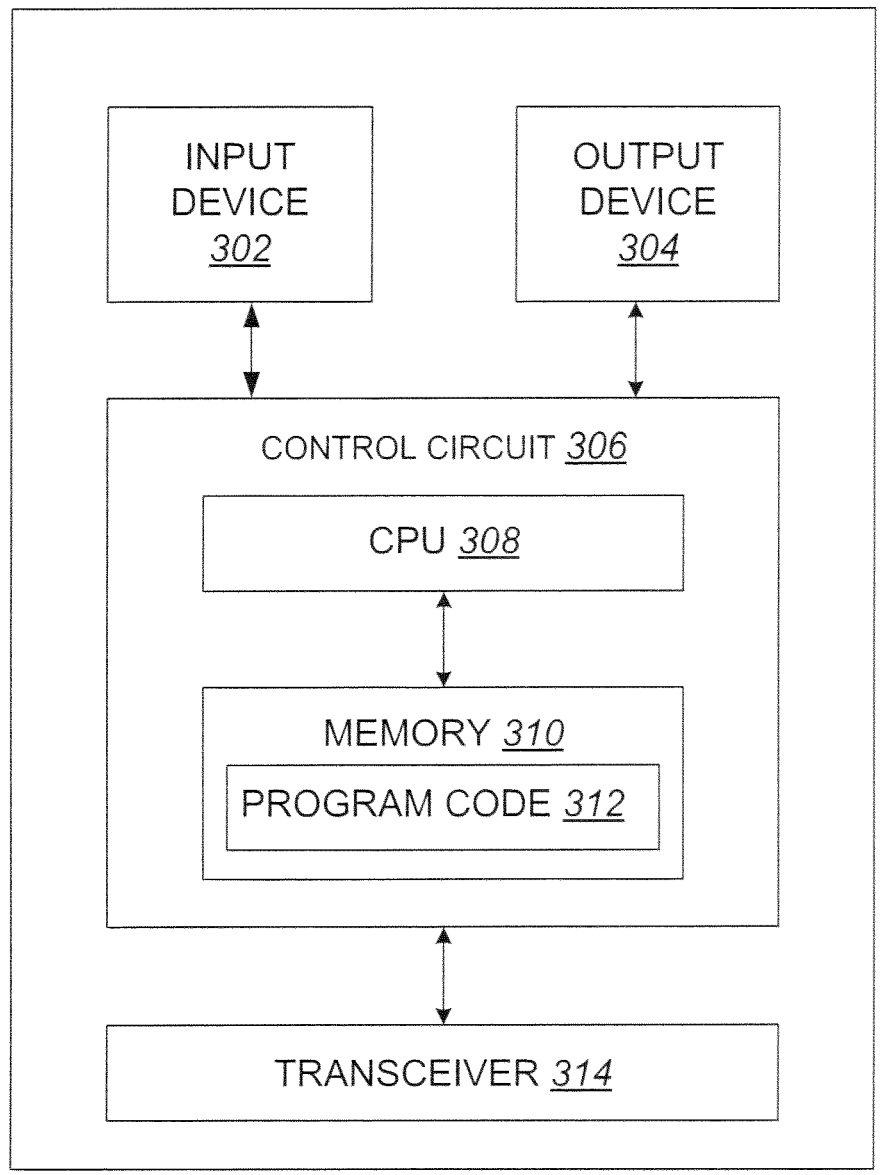
FIG. 5 is a functional block diagram of a communication device according to one exemplary embodiment.

Turning to FIG. 5, this figure shows an alternative simplified functional block diagram of a communication device according to one exemplary embodiment. The communication device 300 in a wireless communication system can be utilized for realizing the UE 104 in FIG. 1, and the wireless communications system is preferably the LTE system, the LTE-A system or the like. The communication device 300 may include an input device 302, an output device 304, a control circuit 306, a central processing unit (CPU) 308, a memory 310, a program code 312, and a transceiver 314. The program code 312 includes the application layers and the layers of the control plane 108 and layers of user plane 110 as discussed above except the PHY layer. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

The LTE DownLink (DL) transmission scheme is based on Orthogonal Frequency Division Multiple Access (OFDMA), and the LTE UpLink (UL) transmission scheme is based on Single-Carrier (SC) Discrete Fourier Transform (DFT)- spread OFDMA (DFT-S-OFDMA) or equivalently. Single Carrier Frequency Division Multiple Access (SC-FDMA). LTE-Advanced (LTE-A), however, is designed to meet higher bandwidth requirements both in the DL and UL directions. In order to provide the higher bandwidth requirements. LTE-A utilizes component carrier aggregation. A user equipment (UE) with reception and/or transmission capabilities for carrier aggregation (CA) can simultaneously receive and/or transmit on multiple component carriers (CCs). A carrier may be defined by a bandwidth and a center frequency.

There are several physical control channels used in the physical layer that are relevant to CA operations. A physical downlink control channel (PDCCH) may inform the UE about the resource allocation of paging channel (PCH) and downlink shared channel (DL-SCH), about hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ ACK/NAK signals in response to downlink transmission, scheduling request and channel quality indicator (CQI). A physical uplink shared channel (PUSCH) carries uplink shared channel (UL-SCH).

Carriers may be divided into a primary component carrier (PCC) and a secondary component carrier (SCC). The PCC refers to a carrier that is constantly activated, and the SCC refers to a carrier that may be activated or deactivated according to the traffic status. Activation means that transmission or reception of traffic data may be performed or traffic data is ready for its transmission or reception on the concerned CC. Deactivation means that transmission or reception of traffic data is not permitted on the concerned CC. The UE uses only a single PCC or one or more SCCs along with the PCC.

A PCC is used by an eNB to exchange traffic and PHY/MAC control signaling with a UE. SCCs are additional carriers which the UE may use for traffic, only per eNB specific commands and rules received on the PCC. The PCC may be a fully configured carrier, by which major control information is exchanged between the eNB and the UE. The SCC may be a fully configured carrier or a partially configured carrier, which is allocated according to a request of the UE or according to an instruction of the eNB. The PCC may be used for entering of the UE into a network or for an allocation of the SCC. The PCC may be changed via a handover procedure.

In LTE, a Primary Cell includes the cell operating in the primary frequency in which the UE either performs the initial connection establishment procedure or initiates the connection re-establishment procedure, or the cell indicated as the primary cell in the handover procedure. The UE also uses the PCell to derive the parameters for the security functions and for upper layer system information such as NAS mobility information. A Secondary Cell (SCell) includes the cell operating on a secondary frequency which may be configured once an RRC connection is established and which may be used to provide additional radio resources. System information relevant for operation in the concerned SCell is typically provided using dedicated signaling when the SCell is added to the UE's configuration. Basically a PCell contains an uplink PCC and a downlink PCC, while an SCell configured to a UE may contain a downlink SCC or an uplink SCC along with a downlink SCC.

In the RRC_CONNECTED state, the network controls UE mobility. For network controlled mobility in the RRC_CONNECTED state, UE mobility is realized with a handover procedure, which is triggered by the network. The network may initiate handover by first configuring the UE to perform measurement reporting or initiate handover without having received measurement reports from the UE.

For UEs that support CA, E-UTRAN can change the PCell with the handover procedure using an RRCConnectionReconfiguration message including the mobilityControlInfo. The RRCConnectionReconfiguration message is the command to modify an RRC connection. It may convey information for measurement configuration, mobility control, radio resource configuration (including RBs, MAC main configuration and physical channel configuration) including any associated dedicated NAS information and security configuration. The E-UTRAN can independently add, remove or modify SCells by means of the RRC connection reconfiguration procedure using the RRCConnectionReconfiguration message, either including the mobilityControlInfo or not.

Before sending the handover message to the UE, the source eNB firstly selects the target eNB. The source eNB may also provide the target eNB with a list of cells. The target eNB decides which serving cells are to be configured for use after handover, which may include cells other than the ones indicated by the source eNB. The target eNB generates the message containing one Pcell or at least one Scell along with one Pcell for initiating the handover. After receiving the handover message, the UE attempts to access the target PCell at the first available RACH occasion according to the defined Random Access resource selection. Upon successful completion of the handover, the UE sends a message to confirm the handover.

Currently, different eNBs do not share the same SCells for carrier aggregation such that no SCell configuration needs to be transferred to the target eNB for delta configuration. Thus, all the current SCells configured to a UE need to be released upon inter-eNB handover. If the SCells configured to a UE before inter-eNB are not released, a newly configured SCell by the new target eNB would be considered by the UE as a modification to an existing SCell with the same SCell index, which may result in inconsistent configurations between the UE and the target eNB. Therefore, all the current SCells configured to a UE should be released upon inter-eNB handover.

However, currently there is no information included in RRCConnectionReconfiguration message for a UE to distinguish whether the handover is an intra-eNB or inter-eNB handover. Accordingly, the UE cannot decide whether or not to release the current SCells upon handover. As a result, the target eNB has to include a sCellToReleaseList with all valid SCell indexes in the handover command for the UE to release all the potentially configured SCells even when there is actually no SCell configured to the UE.

Currently, there are 7 valid values of SCell indexes and the maximum number of SCell indexes in a SCellToReleaseList is only 4. The handover command cannot include all the potential SCell Indexes which may be used in the UE. Accordingly, one additional RRCConnectionReconfiguration message is needed to release all the SCells in the UE. As a result, signaling overhead may be significantly increased.

According to one aspect the disclosure, to avoid the above-described signaling overhead during handover, information is included by the source eNB in the HandoverPreparationInformation message for the target eNB to control SCell release in a UE during an inter-eNB handover procedure. More specifically, the information indicates the SCell indexes of all the SCells configured to the concerned UE, thereby allowing the target eNB to include the sCellToReleaseList with the SCells configured to the UE in the RRCConnectionReconfiguration message so that the UE can release the Scell(s) according to the sCellToReleaseList.

According to another aspect the disclosure, to avoid the above-described signaling overhead during handover, an indicator is included by the target eNB in the RRCConnectionReconfiguration message for a UE to distinguish whether the handover is an intra-eNB or inter-eNB handover. The UE releases all the configured SCells if the handover is an inter-eNB handover.

The above-described exemplary embodiments are described in further detail below with reference to FIGS. 6 and 7.

Figure 6:
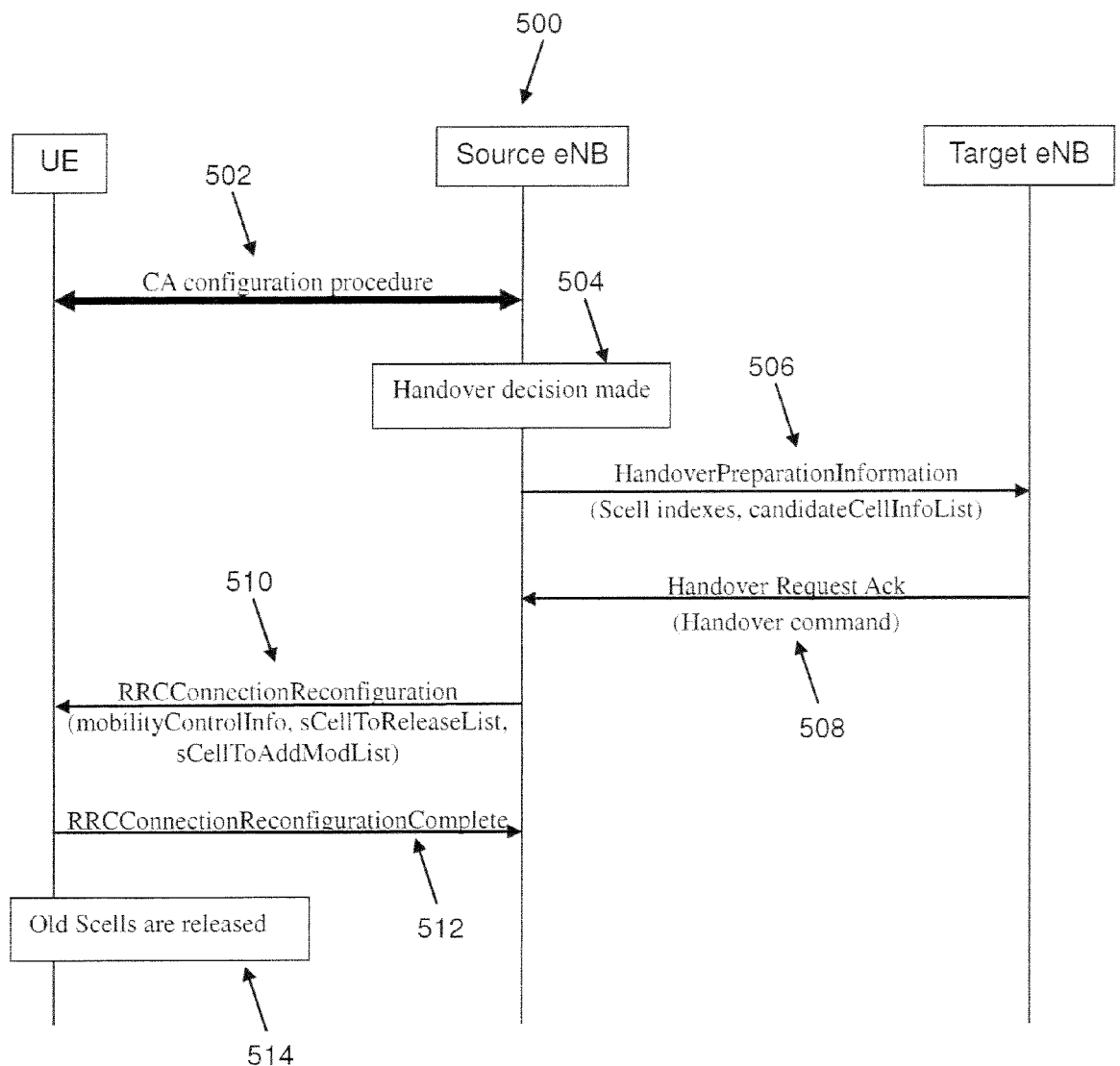
FIG. 6 shows a method of Secondary Cell (SCell) release during handover according to one exemplary embodiment.

Referring to FIG. 6, a method 500 for SCell release during handover according to one exemplary embodiment includes configuring at least one SCell by a source eNB to a UE at 502, and after handover decision is made at 504, including by the source eNB information in a HandoverPreparationInformation message at 506 for a target eNB to control SCell release in the UE during handover. The included information indicates the SCell indexes of all the SCells configured to the UE, thereby allowing the target eNB to include the sCellToReleaseList with the SCells configured to the UE in a handover command, which is contained in a Handover Request Ack message sent to the Source eNB at 508. The HandoverPreparationInformation message may also contain a candidateCellInfoList for the target eNB to select as the Scell(s) to use after handover. The source eNB then sends an RRCConnectionReconfiguration message including mobilityControlInfo and the sCellToReleaseList to the UE at 510. In response, the UE replies with an RRCConnectionReconfigurationComplete message at 512 to complete this procedure. Based on the sCellToReleaseList, the UE releases the Scell(s) configured before handover at 514. The RRCConnectionReconfiguration message may also include an sCelltoAddModList to configure new Scell(s) to the UE. The RRCConnectionReconfiguration message including mobilityControlInfo corresponds to the handover command received from the target eNB.

Figure 7:
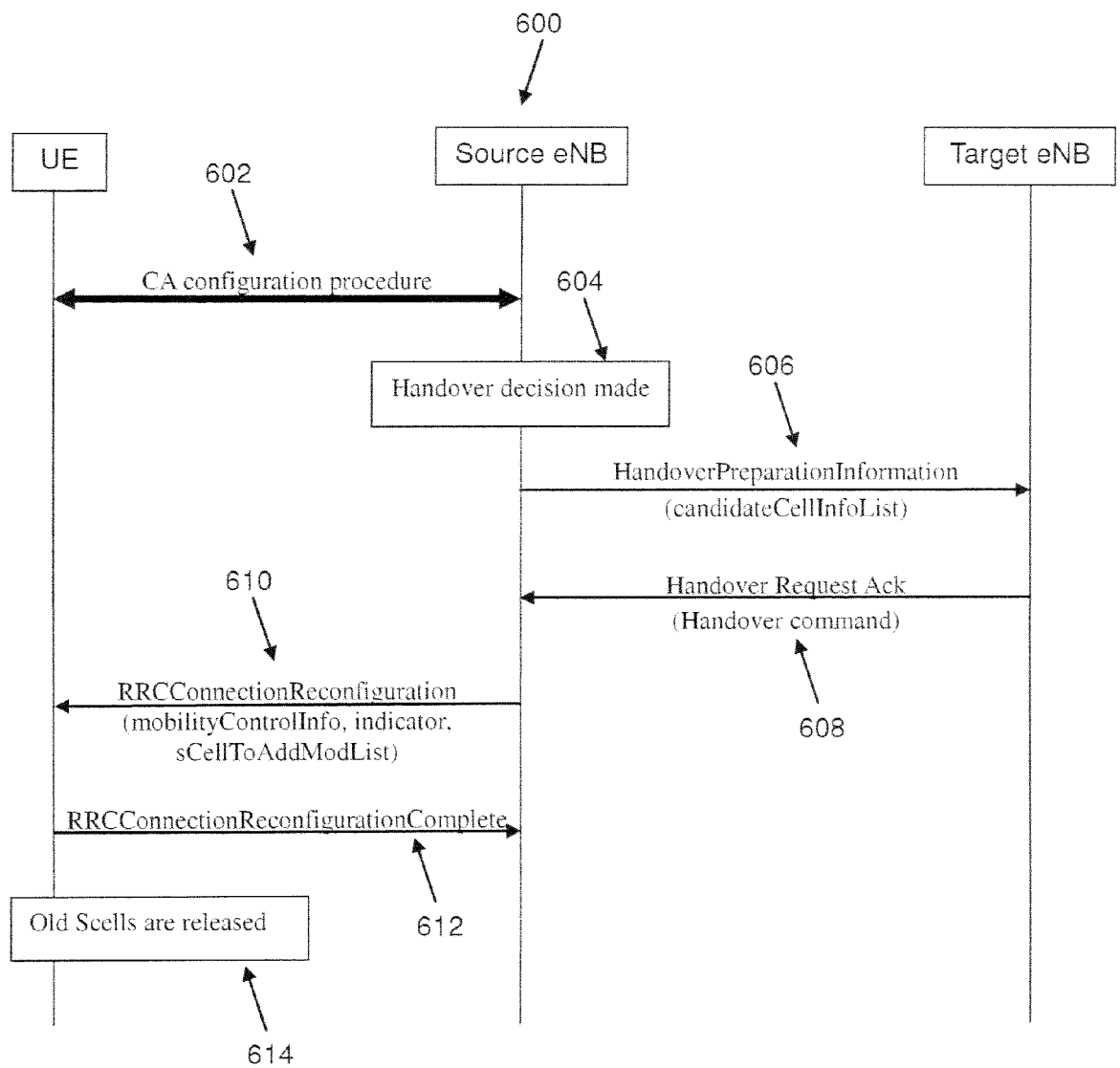
FIG. 7 shows a method of SCell release during handover according to one exemplary embodiment.

Referring to FIG. 7, a method 600 for SCell release during a handover according to one exemplary embodiment includes configuring at least one SCell by a source eNB to a UE at 602. After handover decision is made at 604, the source eNB sends at 606 a HandoverPreparationInformation message containing a candidateCellInfoList for the target eNB to select as the Scell(s) to use after handover. The target eNB then includes an indicator in a handover command for the UE to distinguish whether or not to release all of the configured SCells. The handover command is contained in a Handover Request Ack message sent to the Source eNB at 608. The indicator may indicate whether the handover is an intra-eNB or inter-eNB handover. The source eNB then sends an RRCConnectionReconfiguration message including mobilityControlInfo to the UE at 610. In response, the UE replies with an RRCConnectionReconfigurationComplete message at 612 to complete this procedure. The UE releases all the SCells configured before handover at 614 if the indicator indicates the handover is an inter-eNB handover. The RRCConnectionReconfiguration message may also include an sCellToAddModList to configure new Scell(s) to the UE. The RRCConnectionReconfiguration message including mobilityControlInfo corresponds to the handover command received from the target eNB.

According to the above embodiments, all SCells in the UE are released when the handover is an inter-eNB handover. As described above, releasing all SCells when the handover is an inter-eNB handover reduces signaling overhead.

Referring back to FIG. 5, which is a functional block diagram of a communication device according to one exemplary embodiment and which may be any of the communication devices described herein, the communication device 300 includes a program code 312 stored in memory 310. The CPU 308 executes the program code 312 to perform any one or a plurality of the above-described actions, steps and/or other procedures described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, hits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory. ROM memory, EPROM memory. EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of Secondary Cell (SCell) release during handover comprising:
    configuring at least one SCell by a source eNB to a User Equipment (UE); and
    including information by the source eNB in a HandoverPreparationInformation message for a target eNB to control SCell release in the UE during a handover,
    wherein the information indicates SCell indexes of all SCells configured to the UE before the handover, thereby allowing the target eNB to include a sCellToReleaseList with all the SCells configured to the UE in a handover command for the UE to release the SCells included in the sCellToReleaseList.

2. The method of claim 1, wherein the handover command corresponds to an RRCConnectionReconfiguration message including mobilityControlInfo.

3. The method of claim 2, wherein the RRCConnectionReconfiguration message is sent from the source eNB to the UE to initiate a handover procedure.

4. The method of claim 2, wherein the HandoverPreparationInformation message is sent from the source eNB to the target eNB to request the handover.

5. The method of claim 2, wherein the handover is an inter-eNB handover.

6. The method of claim 3, wherein the HandoverPreparationInformation message is sent from the source eNB to the target eNB to request the handover.

7. The method of claim 3, wherein the handover is an inter-eNB handover.

8. The method of claim 1, wherein the HandoverPreparationInformation message is sent from the source eNB to the target eNB to request the handover.

9. The method of claim 8, wherein the handover is an inter-eNB handover.

10. The method of claim 1, wherein the handover is an inter-eNB handover.

11. The method of claim 1, wherein a RRCConnectionReconfiguration message is sent from the source eNB to the UE to initiate a handover procedure.

12. A communication device for use in a wireless communication system, the communication device comprising:
    a control circuit;
    a processor installed in the control circuit; and
    a memory installed in the control circuit and coupled to the processor;
    wherein the processor is configured to execute a program code stored in memory to:
        configuring at least one SCell by a source eNB to a User Equipment (UE); and
        including information by the source eNB in a HandoverPreparationInformation message for a target eNB to control SCell release in the UE during a handover,
        wherein the information indicates SCell indexes of all SCells configured to the UE before the handover, thereby allowing the target eNB to include a sCellToReleaseList with all the SCells configured to the UE in a handover command for the UE to release the SCells included in the sCellToReleaseList.

13. The device of claim 12, wherein the handover command corresponds to an RRCConnectionReconfiguration message including mobilityControlInfo.

14. The device of claim 13, wherein the RRCConnectionReconfiguration message is sent from the source eNB to the UE to initiate a handover procedure.

15. The device of claim 13, wherein the HandoverPreparationInformation message is sent from the source eNB to the target eNB to request the handover.

16. The device of claim 13, wherein the handover is an inter-eNB handover.

17. The device of claim 14, wherein the HandoverPreparationInformation message is sent from the source eNB to the target eNB to request the handover.

18. The device of claim 14, wherein the handover is an inter-eNB handover.

19. The device of claim 12, wherein the HandoverPreparationInformation message is sent from the source eNB to the target eNB to request the handover.

20. The device of claim 19, wherein the handover is an inter-eNB handover.

21. The device of claim 12, wherein the handover is an inter-eNB handover.

22. The device of claim 12, wherein a RRCConnectionReconfiguration message is sent from the source eNB to the UE to initiate a handover procedure.

\* \* \* \* \*